Aug. 3, 1926. 1,594,786
J. A. H. LUCAS, NÉE PLAGEMANN
POT FOR MAKING AND KEEPING COFFEE OR SIMILAR BEVERAGES
Filed Nov. 3, 1925

Inventor
J.A.H. Lucas
née Plagemann
by
Langner, Parry,
Card & Langner
Atty's

Patented Aug. 3, 1926.

1,594,786

UNITED STATES PATENT OFFICE.

JULIE ANNA HENRIETTE LUCAS, née PLAGEMANN, OF HAMBURG, GERMANY.

POT FOR MAKING AND KEEPING COFFEE OR SIMILAR BEVERAGES.

Application filed November 3, 1925, Serial No. 66,574, and in Germany November 5, 1924.

Pots having within them a strainer for preparing or making coffee are known, and also bottle-shaped receptacles are known which for holding or keeping the ready-made coffee are provided with closing means and with heat-insulated evacuated double walls. The pot forming the subject of the present invention represents a combination of these two kinds of receptacles in such manner that it has a fluid-tight closable spout, and is constructed as a heat-insulated vacuum vessel or the like, and provided inside with a strainer for holding the material (coffee, tea or the like) to be extracted, which strainer is held in place by the cover when the pot is closed. By such combination advantages result which surpass the advantages gained separately by common coffee-pots and vacuum-vessels, because the preparation or making of the coffee and also the holding or keeping of the coffee for a considerable length of time is greatly improved on and simplified. There is the advantage that in making the coffee, owing to the insulating effect the requisite total amount of hot water may be given to the ground coffee at once without necessitating the usual, slow pouring through the funnel and the re-heating of the hot water vessel or the boiling up of the coffee which always impairs the taste. The keeping of the coffee is improved because the making of the coffee need not be carried out in a separate vessel and then poured into the holding or keeping receptacle, but as soon as the water is poured on the coffee even in an unfinished state it can be kept for a long time since, as trials have proved, the strainer can be allowed to remain within the pot for any length of time, even several hours without necessitating inspection of the pot, and without impairing the taste of the coffee. This result is accounted for by the fact that the taste of the coffee always is impaired when the coffee-grounds become cold, and this need not be the case, because the contents of the pot can be held hot for hours, and thus in connection with a far better yield of the coffee a simplification results, which is important for unmarried people, tourists, very busy house-wives and so on.

Figure 1:
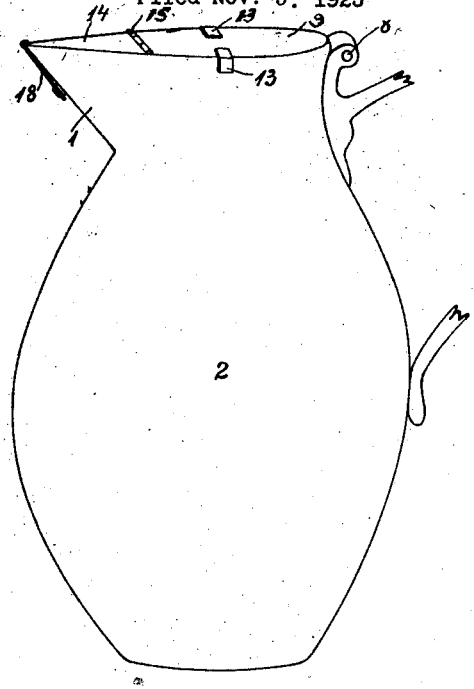
Figure 2:
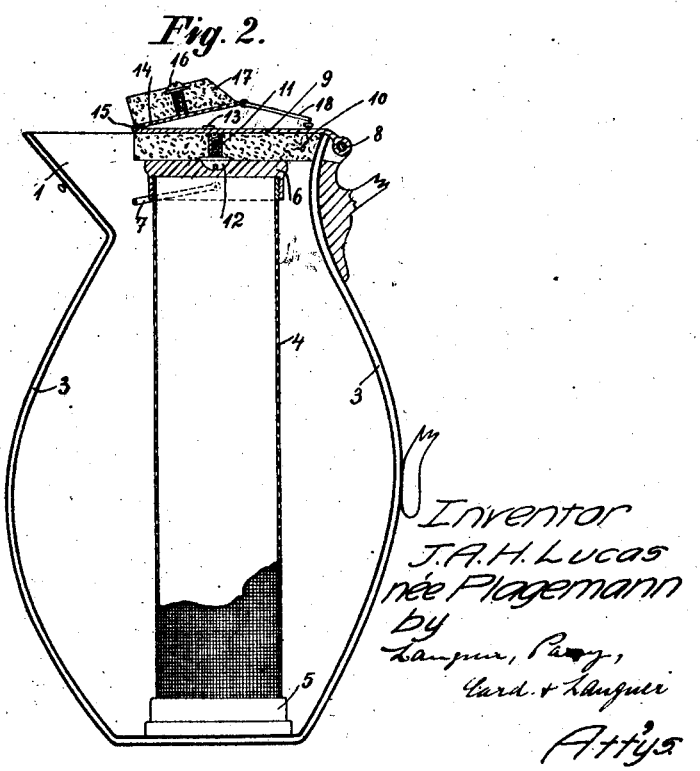

Fig. 1 of the drawing is an elevation of the coffee-pot shown by way of example, and Fig. 2 is a vertical section.

The coffee-pot 2 provided with a spout 1 has a wall 3 which may be insulated in any convenient manner, for instance by being made double and the intermediate space evacuated. Within this pot a strainer is arranged consisting of a cylindrical or otherwise shaped sieve-mantle reaching from top to bottom preferably consisting of wire-netting and being closed on top and bottom, for instance by screw-caps 5 and 6, and having a bow-shaped handle 7 to enable the strainer to be taken out. After taking off one of the caps the ground-coffee can be filled into the strainer preferably by means of a suitable funnel. After use the two caps 5 and 6 can be removed and the wire-netting mantle 4 easily cleaned with a brush. The upper opening of the pot may be shaped to form a spout, and is closed by a cover 9 hinged to the pot at 8 and provided with an insulated cork-plate 10 attached to a screw 11. The head of this screw 11 projects into a corresponding gap 12 in the upper cap 6 of the strainer. This strainer, the height of which corresponds to the distance between the bottom of the pot and the cork-plate 10, is thus held firmly in place when the cover 9 is closed. This cover 9 after being closed down on the opening of the pot is firmly held in place by springy clamps 13 slipping over the beadlike rim of the pot when engaging the cover 9. To enable the liquid contents of the pot to be poured out without removing the strainer the cover 9 is made in sections 14 and 14', of which 14 only covers the spout and is hinged to the section 14' at 15. The section 14 is also provided with a cork-plate 17 fastened by a screw 16. In the open position the section 14 is held by any convenient means, for instance by a snap bow 18 engaging a button 19 or the like attached to the section 14'.

I claim:—

A pot for making and holding coffee and the like, comprising, heat insulated pot walls, a cover hinged to the top of the pot, a strainer within, and reaching from top to bottom of the pot, and means on the cover and strainer for permitting the strainer to be held in place by the cover when closed, the cover including two sections hinged together, one section being arranged to close the spout so that the spout alone can be opened while the other section is left closed and holds the strainer in place.

In testimony whereof I have signed my name to this specification.

Mrs. JULIE ANNA HENRIETTE LUCAS, née PLAGEMANN.